(12) United States Patent
Greenwood et al.

(10) Patent No.: US 9,971,943 B2
(45) Date of Patent: *May 15, 2018

(54) VEHICLE TRAILER ANGLE DETECTION SYSTEM AND METHOD

(71) Applicant: Ford Global Technologies, LLC, Dearborn, MI (US)

(72) Inventors: Jeremy John Greenwood, Sutton Coldfield (GB); Stephen Nicholls, Witney (GB); Andrew Stephen Bell Crawford, Grayshill (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/370,223

(22) Filed: Dec. 6, 2016

(65) Prior Publication Data

US 2017/0083773 A1 Mar. 23, 2017

Related U.S. Application Data

(60) Continuation of application No. 14/854,285, filed on Sep. 15, 2015, now Pat. No. 9,566,911, which is a (Continued)

(30) Foreign Application Priority Data

Mar. 21, 2007 (GB) .................................. 0705336.6

(51) Int. Cl.
  *B60R 1/00* (2006.01)
  *G06K 9/00* (2006.01)
  (Continued)

(52) U.S. Cl.
  CPC ............ *G06K 9/00791* (2013.01); *B60R 1/00* (2013.01); *B60R 1/003* (2013.01); *B60W 50/14* (2013.01);
  (Continued)

(58) Field of Classification Search
  CPC ..... B60R 1/00; B60R 1/003; B60R 2300/101; B60R 2300/108; B60R 2300/301;
  (Continued)

(56) References Cited

U.S. PATENT DOCUMENTS 3,447,835 A 6/1969 Parkhurst, Jr.
3,542,390 A 11/1970 Fikes et al.
(Continued)

FOREIGN PATENT DOCUMENTS

CN 101610420 A 12/2009
CN 101833869 A 9/2010
(Continued)

OTHER PUBLICATIONS

Caup et al, Video-based Trailer Detection and Articulation Estimation, Jun. 23-26, 2013.*
(Continued)

*Primary Examiner* — Shan E Elahi
(74) *Attorney, Agent, or Firm* — Frank MacKenzie; Price Heneveld LLP

(57) ABSTRACT

A vehicle 1 towing a trailer 4 is fitted with three video cameras 5, 6, 7 fitted to the rear of the vehicle and on each door mirror. A view from any camera can be presented to the driver on a display 11. A predicted trailer path, calculated in a computing unit 10, is also presented to the driver on the display 11 as guide lines overlaid on the camera view. The computing unit 10 is also configured to calculate a hitch angle by tracking the position of a trailer-mounted marker in the camera view.

20 Claims, 3 Drawing Sheets

Related U.S. Application Data continuation of application No. 13/448,529, filed on Apr. 17, 2012, now Pat. No. 9,156,496, which is a division of application No. 11/936,860, filed on Nov. 8, 2007, now abandoned.

(51) Int. Cl.

| | | |
|---|---|---|
| *B62D 13/06* | (2006.01) | |
| *B62D 15/02* | (2006.01) | |
| *G01B 11/27* | (2006.01) | |
| *G06T 7/00* | (2017.01) | |
| *G06T 7/20* | (2017.01) | |
| *G08G 1/16* | (2006.01) | |
| *H04N 5/225* | (2006.01) | |
| *H04N 7/18* | (2006.01) | |
| *B60W 50/14* | (2012.01) | |

(52) U.S. Cl.
 CPC ........... *B62D 13/06* (2013.01); *B62D 15/021* (2013.01); *B62D 15/024* (2013.01); *G01B 11/272* (2013.01); *G06T 7/0008* (2013.01); *G06T 7/20* (2013.01); *G08G 1/166* (2013.01); *G08G 1/167* (2013.01); *G08G 1/168* (2013.01); *H04N 5/2253* (2013.01); *H04N 7/183* (2013.01); *B60R 2300/101* (2013.01); *B60R 2300/108* (2013.01); *B60R 2300/301* (2013.01); *B60R 2300/305* (2013.01); *B60R 2300/50* (2013.01); *B60R 2300/802* (2013.01); *B60R 2300/806* (2013.01); *B60R 2300/8086* (2013.01); *B60R 2300/8093* (2013.01); *B60W 2050/143* (2013.01); *G08G 1/16* (2013.01)

(58) Field of Classification Search
 CPC .......... B60R 2300/305; B60R 2300/50; B60R 2300/802; B60R 2300/806; B60R 2300/8086; B60R 2300/8093; B60W 2050/143; B60W 50/14; B62D 13/06; B62D 15/021
 USPC ....................................................... 348/148
 See application file for complete search history.

(56) References Cited

U.S. PATENT DOCUMENTS

| | | |
|---|---|---|
| 3,605,088 A | 9/1971 | Savelli |
| 3,787,007 A | 1/1974 | Sanders |
| 3,833,928 A | 9/1974 | Gavit et al. |
| 3,860,257 A | 1/1975 | Mesley |
| 3,908,782 A | 9/1975 | Lang et al. |
| 3,924,257 A | 12/1975 | Roberts |
| 4,040,006 A | 8/1977 | Kimmel |
| 4,042,132 A | 8/1977 | Bohman et al. |
| 4,044,706 A | 8/1977 | Gill |
| 4,122,390 A | 10/1978 | Kollitz et al. |
| 4,212,483 A | 7/1980 | Howard |
| 4,277,804 A | 7/1981 | Robison |
| 4,313,616 A | 2/1982 | Howard |
| 4,366,966 A | 1/1983 | Ratsko et al. |
| 4,430,637 A | 2/1984 | Koch-Ducker et al. |
| 4,651,201 A | 3/1987 | Schoolman |
| 4,735,432 A | 4/1988 | Brown |
| 4,752,080 A | 6/1988 | Rogers |
| 4,846,094 A | 7/1989 | Woods |
| 4,848,499 A | 7/1989 | Martinet et al. |
| 4,852,901 A | 8/1989 | Beasley et al. |
| 4,897,642 A | 1/1990 | DiLullo et al. |
| 4,931,930 A | 6/1990 | Shyu et al. |
| 4,943,080 A | 7/1990 | Reimer |
| 4,947,097 A | 8/1990 | Tao |
| 5,001,639 A | 3/1991 | Breen |
| 5,027,200 A | 6/1991 | Petrossian et al. |
| 5,029,948 A | 7/1991 | Breen et al. |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,134,352 A | 7/1992 | Matsumoto et al. |
| 5,142,278 A | 8/1992 | Moallemi et al. |
| 5,152,544 A | 10/1992 | Dierker, Jr. et al. |
| 5,155,683 A | 10/1992 | Rahim |
| 5,172,961 A | 12/1992 | Inoue et al. |
| 5,191,328 A | 3/1993 | Nelson |
| 5,235,316 A | 8/1993 | Qualizza |
| 5,244,226 A | 9/1993 | Bergh |
| 5,282,641 A | 2/1994 | McLaughlin |
| 5,289,892 A | 3/1994 | Notsu |
| 5,290,057 A | 3/1994 | Pellerito |
| 5,329,451 A | 7/1994 | Notsu |
| 5,411,322 A | 5/1995 | Breen |
| 5,442,810 A | 8/1995 | Jenquin |
| 5,455,557 A | 10/1995 | Noll et al. |
| 5,461,357 A | 10/1995 | Yoshioka et al. |
| 5,521,633 A | 5/1996 | Nakijima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,587,938 A | 12/1996 | Hoetzel |
| 5,631,656 A | 5/1997 | Hartman et al. |
| 5,646,614 A | 7/1997 | Abersfelder et al. |
| 5,650,764 A | 7/1997 | McCullough |
| 5,690,347 A | 11/1997 | Juergens et al. |
| 5,696,681 A | 12/1997 | Hrovat et al. |
| 5,719,713 A | 2/1998 | Brown |
| 5,734,336 A | 3/1998 | Smithline |
| 5,747,683 A | 5/1998 | Gerum et al. |
| 5,781,662 A | 7/1998 | Mori et al. |
| 5,821,852 A | 10/1998 | Fairchild |
| 5,863,057 A | 1/1999 | Wessels |
| 5,905,433 A | 5/1999 | Wortham |
| 5,947,588 A | 9/1999 | Huang |
| 5,947,637 A | 9/1999 | Neuling |
| 5,951,035 A | 9/1999 | Phillips, Jr. et al. |
| 5,956,181 A | 9/1999 | Lin |
| 5,957,232 A | 9/1999 | Shimizu et al. |
| 5,970,619 A | 10/1999 | Wells |
| 5,980,048 A | 11/1999 | Rannells, Jr. et al. |
| 5,999,091 A | 12/1999 | Wortham |
| 6,021,367 A | 2/2000 | Pilutti et al. |
| 6,041,582 A | 3/2000 | Tiede et al. |
| 6,042,196 A | 3/2000 | Nakamura et al. |
| 6,059,383 A | 5/2000 | Paggi et al. |
| 6,076,033 A | 6/2000 | Hamada et al. |
| 6,078,849 A | 6/2000 | Brady et al. |
| 6,100,795 A | 8/2000 | Otterbacher et al. |
| 6,124,709 A | 9/2000 | Allwine |
| 6,132,014 A | 10/2000 | Kiso et al. |
| 6,142,372 A | 11/2000 | Wright |
| 6,151,175 A | 11/2000 | Osha |
| 6,178,650 B1 | 1/2001 | Thibodeaux |
| 6,182,010 B1 | 1/2001 | Berstis |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,226,226 B1 | 5/2001 | Lill et al. |
| 6,259,357 B1 | 7/2001 | Heider |
| 6,268,800 B1 | 7/2001 | Howard |
| 6,292,094 B1 | 9/2001 | Deng et al. |
| 6,318,747 B1 | 11/2001 | Ratican |
| 6,338,015 B1 | 1/2002 | Kawagoe et al. |
| 6,351,698 B1 | 2/2002 | Kubota et al. |
| 6,366,202 B1 | 4/2002 | Rosenthal |
| 6,374,162 B1 | 4/2002 | Tanaka et al. |
| 6,411,898 B2 | 6/2002 | Ishida et al. |
| 6,434,486 B1 | 8/2002 | Studt et al. |
| 6,472,865 B1 | 10/2002 | Tola et al. |

(56) References Cited

U.S. PATENT DOCUMENTS

| | | |
|---|---|---|
| 6,476,730 B2 | 11/2002 | Kakinami et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,523,911 B1 | 2/2003 | Rupp et al. |
| 6,526,335 B1 | 2/2003 | Treyz et al. |
| 6,539,288 B2 | 3/2003 | Ishida et al. |
| 6,568,093 B2 | 5/2003 | Kogiso et al. |
| 6,573,833 B1 | 6/2003 | Rosenthal |
| 6,577,952 B2 | 6/2003 | Geier et al. |
| 6,580,984 B2 | 6/2003 | Fecher et al. |
| 6,587,760 B2 | 7/2003 | Okamoto |
| 6,588,858 B2 | 7/2003 | Ritz et al. |
| 6,593,960 B1 | 7/2003 | Sugimoto et al. |
| 6,604,592 B2 | 8/2003 | Pietsch et al. |
| 6,612,394 B2 | 9/2003 | Wessman |
| 6,643,576 B1 | 11/2003 | O'Connor et al. |
| 6,668,225 B2 | 12/2003 | Oh et al. |
| 6,683,539 B2 | 1/2004 | Trajkovic et al. |
| 6,690,413 B1 | 2/2004 | Moore |
| 6,693,524 B1 | 2/2004 | Payne |
| 6,704,637 B1 | 3/2004 | Hrazdera et al. |
| 6,712,378 B1 | 3/2004 | Austin |
| 6,734,787 B2 | 5/2004 | Ikeda |
| 6,778,891 B2 | 8/2004 | Tanaka et al. |
| 6,801,125 B1 | 10/2004 | McGregor et al. |
| 6,806,809 B2 * | 10/2004 | Lee .................. B60D 1/58 280/419 |
| 6,816,765 B2 | 11/2004 | Yamamoto et al. |
| 6,820,888 B1 | 11/2004 | Griffin |
| 6,837,432 B2 | 1/2005 | Tsikos et al. |
| 6,838,979 B2 | 1/2005 | Deng et al. |
| 6,847,916 B1 | 1/2005 | Ying |
| 6,854,557 B1 | 2/2005 | Deng et al. |
| 6,857,494 B2 | 2/2005 | Kobayashi et al. |
| 6,879,240 B2 | 4/2005 | Kruse |
| 6,891,563 B2 | 5/2005 | Schofield et al. |
| 6,933,837 B2 | 8/2005 | Gunderson et al. |
| 6,956,468 B2 | 10/2005 | Lee et al. |
| 6,959,970 B2 | 11/2005 | Tseng |
| 6,970,184 B2 | 11/2005 | Hirama et al. |
| 6,989,739 B2 | 1/2006 | Li |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,026,957 B2 | 4/2006 | Rubenstein |
| 7,028,804 B2 | 4/2006 | Eki et al. |
| 7,032,705 B2 | 4/2006 | Zheng et al. |
| 7,036,840 B2 | 5/2006 | Kwilinski |
| 7,039,504 B2 | 5/2006 | Tanaka et al. |
| 7,046,127 B2 | 5/2006 | Boddy |
| 7,047,117 B2 | 5/2006 | Akiyama et al. |
| 7,053,795 B2 | 5/2006 | Maemura et al. |
| 7,058,493 B2 | 6/2006 | Inagaki |
| 7,085,634 B2 | 8/2006 | Endo et al. |
| 7,089,101 B2 | 8/2006 | Fischer et al. |
| 7,136,754 B2 | 11/2006 | Hahn et al. |
| 7,142,098 B2 | 11/2006 | Lang et al. |
| 7,154,385 B2 | 12/2006 | Lee et al. |
| 7,159,890 B2 | 1/2007 | Craig et al. |
| 7,161,616 B1 | 1/2007 | Okamoto et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,175,194 B2 | 2/2007 | Ball |
| 7,195,267 B1 * | 3/2007 | Thompson ............ B60D 1/36 280/477 |
| 7,204,504 B2 | 4/2007 | Gehring et al. |
| 7,207,041 B2 | 4/2007 | Elson et al. |
| 7,219,913 B2 | 5/2007 | Atley |
| 7,220,217 B2 | 5/2007 | Tamai et al. |
| 7,225,891 B2 | 6/2007 | Gehring et al. |
| 7,229,139 B2 | 6/2007 | Lu et al. |
| 7,237,790 B2 | 7/2007 | Gehring et al. |
| 7,239,958 B2 | 7/2007 | Grougan et al. |
| 7,266,435 B2 | 9/2007 | Wang et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,309,075 B2 | 12/2007 | Ramsey et al. |
| 7,319,927 B1 | 1/2008 | Sun et al. |
| 7,352,388 B2 | 4/2008 | Miwa et al. |
| 7,353,110 B2 | 4/2008 | Kim |
| 7,366,892 B2 | 4/2008 | Spaur et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,505,784 B2 | 3/2009 | Barbera |
| 7,532,109 B2 | 5/2009 | Takahama et al. |
| 7,537,256 B2 | 5/2009 | Gates et al. |
| 7,540,523 B2 | 6/2009 | Russell et al. |
| 7,548,155 B2 | 6/2009 | Schutt et al. |
| 7,552,009 B2 | 6/2009 | Nelson |
| 7,568,716 B2 | 8/2009 | Dietz |
| 7,602,782 B2 | 10/2009 | Doviak et al. |
| 7,619,680 B1 | 11/2009 | Bingle et al. |
| 7,623,952 B2 | 11/2009 | Unruh et al. |
| 7,640,089 B2 | 12/2009 | Deng et al. |
| 7,640,108 B2 | 12/2009 | Shimizu et al. |
| 7,648,153 B2 | 1/2010 | Metternich et al. |
| 7,658,524 B2 | 2/2010 | Johnson et al. |
| 7,688,221 B2 | 3/2010 | Watanabe et al. |
| 7,689,253 B2 | 3/2010 | Basir |
| 7,690,737 B2 | 4/2010 | Lu |
| 7,692,557 B2 | 4/2010 | Medina et al. |
| 7,693,661 B2 | 4/2010 | Iwasaka |
| 7,706,944 B2 | 4/2010 | Tanaka et al. |
| 7,715,953 B2 | 5/2010 | Shepard |
| 7,731,302 B2 | 6/2010 | Tandy, Jr. et al. |
| 7,744,109 B2 | 6/2010 | Groh |
| 7,760,077 B2 | 7/2010 | Day |
| 7,777,615 B2 | 8/2010 | Okuda et al. |
| 7,783,699 B2 | 8/2010 | Rasin et al. |
| 7,786,849 B2 | 8/2010 | Buckley |
| 7,793,965 B2 | 9/2010 | Padula |
| 7,798,263 B2 | 9/2010 | Tandy, Jr. et al. |
| 7,801,941 B2 | 9/2010 | Conneely et al. |
| 7,825,782 B2 | 11/2010 | Hermann |
| 7,827,047 B2 | 11/2010 | Anderson et al. |
| 7,840,347 B2 | 11/2010 | Noguchi |
| 7,878,545 B2 | 2/2011 | Rhymer et al. |
| 7,904,222 B2 * | 3/2011 | Lee .................. B60D 1/58 340/932.2 |
| 7,905,507 B2 | 3/2011 | Perri |
| 7,907,975 B2 | 3/2011 | Sakamoto et al. |
| 7,917,081 B2 | 3/2011 | Voto et al. |
| 7,932,623 B2 | 4/2011 | Burlak et al. |
| 7,932,815 B2 | 4/2011 | Martinez et al. |
| 7,950,751 B2 | 5/2011 | Offerle et al. |
| 7,953,536 B2 | 5/2011 | Katrak |
| 7,969,326 B2 | 6/2011 | Sakakibara |
| 7,974,444 B2 | 7/2011 | Hongo |
| 8,009,025 B2 | 8/2011 | Engstrom et al. |
| 8,010,252 B2 | 8/2011 | Getman et al. |
| 8,010,253 B2 | 8/2011 | Lundquist |
| 8,019,592 B2 | 9/2011 | Fukuoka et al. |
| 8,024,743 B2 | 9/2011 | Werner |
| 8,033,955 B2 | 10/2011 | Farnsworth |
| 8,036,792 B2 | 10/2011 | Dechamp |
| 8,037,500 B2 | 10/2011 | Margis et al. |
| 8,038,166 B1 | 10/2011 | Piesinger |
| 8,044,776 B2 | 10/2011 | Schofield et al. |
| 8,044,779 B2 | 10/2011 | Hahn et al. |
| 8,068,019 B2 | 11/2011 | Bennie et al. |
| 8,073,594 B2 * | 12/2011 | Lee .................. B60D 1/58 359/843 |
| 8,121,802 B2 | 2/2012 | Grider et al. |

(56) References Cited

U.S. PATENT DOCUMENTS

| | | |
|---|---|---|
| 8,131,458 B1 | 3/2012 | Silka |
| 8,138,899 B2 | 3/2012 | Ghneim |
| 8,139,109 B2 | 3/2012 | Schmiedel et al. |
| 8,140,138 B2 | 3/2012 | Chrumka |
| 8,150,474 B2 | 4/2012 | Saito et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,169,341 B2 | 5/2012 | Toledo et al. |
| 8,170,726 B2 | 5/2012 | Chen et al. |
| 8,174,576 B2 | 5/2012 | Akatsuka et al. |
| 8,179,238 B2 | 5/2012 | Roberts, Sr. et al. |
| 8,180,543 B2 | 5/2012 | Futamura et al. |
| 8,190,364 B2 | 5/2012 | Rekow |
| 8,191,915 B2 | 6/2012 | Freese et al. |
| 8,192,036 B2 | 6/2012 | Lee et al. |
| 8,192,064 B2 | 6/2012 | Johnson et al. |
| 8,195,145 B2 | 6/2012 | Angelhag |
| 8,205,704 B2 | 6/2012 | Kadowaki et al. |
| 8,215,436 B2 | 7/2012 | DeGrave et al. |
| 8,223,204 B2 | 7/2012 | Hahn |
| 8,224,078 B2 | 7/2012 | Boncyk et al. |
| 8,244,442 B2 | 8/2012 | Craig et al. |
| 8,245,270 B2 | 8/2012 | Cooperstein et al. |
| 8,255,007 B2 | 8/2012 | Saito et al. |
| 8,260,518 B2 | 9/2012 | Englert |
| 8,267,485 B2 | 9/2012 | Barlsen et al. |
| 8,270,933 B2 | 9/2012 | Riemer et al. |
| 8,280,607 B2 | 10/2012 | Gatti et al. |
| 8,290,657 B2 | 10/2012 | Lavoie |
| 8,308,182 B2 | 11/2012 | Ortmann et al. |
| 8,310,353 B2 | 11/2012 | Hinninger et al. |
| 8,315,617 B2 | 11/2012 | Tadayon et al. |
| 8,319,618 B2 | 11/2012 | Gomi et al. |
| 8,319,663 B2 | 11/2012 | Von Reyher et al. |
| 8,326,504 B2 | 12/2012 | Wu et al. |
| 8,332,097 B2 | 12/2012 | Chiba et al. |
| 8,342,560 B2 | 1/2013 | Albers et al. |
| 8,352,575 B2 | 1/2013 | Samaha |
| 8,362,888 B2 | 1/2013 | Roberts, Sr. et al. |
| 8,370,056 B2 | 2/2013 | Trombley et al. |
| 8,374,749 B2 | 2/2013 | Tanaka |
| 8,380,390 B2 | 2/2013 | Sy et al. |
| 8,380,416 B2 | 2/2013 | Offerle et al. |
| 8,390,686 B2 | 3/2013 | Komoto et al. |
| 8,392,066 B2 | 3/2013 | Ehara et al. |
| 8,393,632 B2 | 3/2013 | Vortmeyer et al. |
| 8,401,744 B2 | 3/2013 | Chiocco |
| 8,406,956 B2 | 3/2013 | Way et al. |
| 8,414,171 B2 | 4/2013 | Kawamura |
| 8,417,263 B2 | 4/2013 | Jenkins et al. |
| 8,417,417 B2 | 4/2013 | Chen et al. |
| 8,417,444 B2 | 4/2013 | Smid et al. |
| 8,427,288 B2 | 4/2013 | Schofield et al. |
| 8,451,107 B2 | 5/2013 | Lu et al. |
| 8,469,125 B2 | 6/2013 | Yu et al. |
| 8,471,691 B2 | 6/2013 | Zhang et al. |
| 8,473,575 B2 | 6/2013 | Marchiwicki et al. |
| 8,494,439 B2 | 7/2013 | Faenger |
| 8,498,757 B2 | 7/2013 | Bowden et al. |
| 8,498,770 B2 | 7/2013 | Takano |
| 8,504,243 B2 | 8/2013 | Kageyama |
| 8,538,785 B2 | 9/2013 | Coleman et al. |
| 8,548,680 B2 | 10/2013 | Ryerson et al. |
| 8,548,683 B2 | 10/2013 | Cebon et al. |
| 8,560,175 B2 | 10/2013 | Bammert et al. |
| 8,571,758 B2 | 10/2013 | Klier et al. |
| 8,576,115 B2 | 11/2013 | Basten |
| 8,626,382 B2 | 1/2014 | Obradovich |
| 8,645,015 B2 | 2/2014 | Oetiker et al. |
| 8,675,953 B1 | 3/2014 | Elwell et al. |
| 8,755,984 B2 | 6/2014 | Rupp et al. |
| 8,786,417 B2 | 7/2014 | Holmen et al. |
| 8,788,204 B2 | 7/2014 | Shimizu |
| 8,797,190 B2 | 8/2014 | Kolbe et al. |
| 8,798,860 B2 | 8/2014 | Dechamp |
| 8,807,261 B2 | 8/2014 | Subrt et al. |
| 8,811,698 B2 | 8/2014 | Kono et al. |
| 8,823,796 B2 | 9/2014 | Shen et al. |
| 8,825,221 B2 | 9/2014 | Hueger et al. |
| 8,825,328 B2 | 9/2014 | Rupp et al. |
| 8,833,789 B2 | 9/2014 | Anderson |
| 8,836,786 B2 | 9/2014 | Seger et al. |
| 8,838,353 B2 | 9/2014 | Wu et al. |
| 8,868,329 B2 | 10/2014 | Ikeda et al. |
| 8,886,400 B2 | 11/2014 | Kossira et al. |
| 8,888,120 B2 | 11/2014 | Trevino |
| 8,892,360 B2 | 11/2014 | Otani |
| 8,909,426 B2 | 12/2014 | Rhode et al. |
| 8,928,757 B2 | 1/2015 | Maekawa et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,957,786 B2 | 2/2015 | Stempnik et al. |
| 8,972,109 B2 | 3/2015 | Lavoie et al. |
| 9,008,913 B1 | 4/2015 | Sears et al. |
| 9,013,286 B2 | 4/2015 | Chen et al. |
| 9,014,901 B2 | 4/2015 | Wang et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,094,583 B2 | 7/2015 | Shih et al. |
| 9,102,271 B2 | 8/2015 | Trombley |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,208,686 B2 | 12/2015 | Takamatsu |
| 9,227,474 B2 | 1/2016 | Liu |
| 9,238,483 B2 | 1/2016 | Hafner et al. |
| 9,246,242 B2 | 1/2016 | Scanzillo et al. |
| 9,247,442 B2 | 1/2016 | Lee et al. |
| 9,248,858 B2 | 2/2016 | Lavoie et al. |
| 9,264,672 B2 | 2/2016 | Lynam |
| 9,315,151 B2 | 4/2016 | Taylor et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 9,393,996 B2 | 7/2016 | Goswami et al. |
| 9,400,897 B2 | 7/2016 | Bruening et al. |
| 9,464,913 B2 | 10/2016 | Brown et al. |
| 9,499,018 B2 | 11/2016 | Gehrke et al. |
| 9,500,497 B2 | 11/2016 | Lavoie et al. |
| 9,508,189 B2 | 11/2016 | Han et al. |
| 9,520,063 B2 | 12/2016 | Noh |
| 2001/0024333 A1 | 9/2001 | Rost |
| 2001/0037164 A1 | 11/2001 | Hecker |
| 2002/0002427 A1 | 1/2002 | Ishida et al. |
| 2002/0005780 A1 | 1/2002 | Ehrlich et al. |
| 2002/0084916 A1 | 7/2002 | Shimizu et al. |
| 2002/0098853 A1 | 7/2002 | Chrumka |
| 2002/0111118 A1 | 8/2002 | Klisner et al. |
| 2002/0128764 A1 | 9/2002 | Hecker et al. |
| 2002/0145663 A1 | 10/2002 | Mizusawa et al. |
| 2002/0149673 A1 | 10/2002 | Hirama et al. |
| 2003/0079123 A1 | 4/2003 | Mas Ribes |
| 2003/0147534 A1 | 8/2003 | Ablay et al. |
| 2003/0160428 A1* | 8/2003 | Lindell ............ B60D 1/30 280/432 |
| 2003/0222982 A1 | 12/2003 | Hamdan et al. |
| 2003/0234512 A1 | 12/2003 | Holub |
| 2004/0017828 A1 | 1/2004 | Zielinski et al. |
| 2004/0021291 A1 | 2/2004 | Haug et al. |
| 2004/0036601 A1 | 2/2004 | Obradovich |
| 2004/0041942 A1 | 3/2004 | Jones |
| 2004/0056779 A1 | 3/2004 | Rast |
| 2004/0093139 A1 | 5/2004 | Wildey et al. |

(56) References Cited

U.S. PATENT DOCUMENTS

| | | |
|---|---|---|
| 2004/0119822 A1 | 6/2004 | Custer et al. |
| 2004/0130441 A1 | 7/2004 | Lee et al. |
| 2004/0203660 A1 | 10/2004 | Tibrewal et al. |
| 2004/0207525 A1 | 10/2004 | Wholey et al. |
| 2004/0215374 A1 | 10/2004 | Shepard |
| 2004/0220724 A1 | 11/2004 | Hahn et al. |
| 2004/0222881 A1 | 11/2004 | Deng et al. |
| 2004/0260438 A1 | 12/2004 | Chernetsky et al. |
| 2005/0000738 A1 | 1/2005 | Gehring et al. |
| 2005/0046696 A1 | 3/2005 | Lang et al. |
| 2005/0073433 A1 | 4/2005 | Gunderson et al. |
| 2005/0074143 A1* | 4/2005 | Kawai .................... B60D 1/36 382/104 |
| 2005/0091408 A1 | 4/2005 | Parupudi et al. |
| 2005/0104322 A1 | 5/2005 | Swannie |
| 2005/0128059 A1 | 6/2005 | Vause |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0193603 A1 | 9/2005 | Schultz et al. |
| 2005/0200700 A1 | 9/2005 | Schofield et al. |
| 2005/0206224 A1 | 9/2005 | Lu |
| 2005/0206225 A1 | 9/2005 | Offerle et al. |
| 2005/0206226 A1 | 9/2005 | Lu et al. |
| 2005/0206229 A1 | 9/2005 | Lu et al. |
| 2005/0206231 A1 | 9/2005 | Lu et al. |
| 2005/0206232 A1 | 9/2005 | Offerle |
| 2005/0206233 A1 | 9/2005 | Offerle et al. |
| 2005/0206234 A1 | 9/2005 | Tseng et al. |
| 2005/0206235 A1 | 9/2005 | Tseng |
| 2005/0206299 A1 | 9/2005 | Nakamura et al. |
| 2005/0209762 A1 | 9/2005 | Lu et al. |
| 2005/0209763 A1 | 9/2005 | Offerle et al. |
| 2005/0236201 A1 | 10/2005 | Spanheimer et al. |
| 2005/0236894 A1 | 10/2005 | Lu et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0139483 A1 | 6/2006 | Jung |
| 2006/0142936 A1 | 6/2006 | Dix |
| 2006/0155455 A1 | 7/2006 | Lucas et al. |
| 2006/0156315 A1 | 7/2006 | Wood et al. |
| 2006/0171704 A1 | 8/2006 | Bingle et al. |
| 2006/0176370 A1 | 8/2006 | Chen et al. |
| 2006/0187008 A1* | 8/2006 | Yu ......................... B60D 1/58 340/431 |
| 2006/0190097 A1 | 8/2006 | Rubenstein |
| 2006/0190147 A1 | 8/2006 | Lee et al. |
| 2006/0238538 A1 | 10/2006 | Kapler et al. |
| 2006/0244579 A1* | 11/2006 | Raab .................... B60T 8/1708 340/438 |
| 2006/0250501 A1 | 11/2006 | Widmann et al. |
| 2006/0276959 A1 | 12/2006 | Matsuoka et al. |
| 2006/0287821 A1 | 12/2006 | Lin |
| 2006/0293800 A1 | 12/2006 | Bauer et al. |
| 2007/0019421 A1 | 1/2007 | Kregness et al. |
| 2007/0027581 A1 | 2/2007 | Bauer et al. |
| 2007/0057816 A1 | 3/2007 | Sakakibara et al. |
| 2007/0058273 A1 | 3/2007 | Ito et al. |
| 2007/0090688 A1 | 4/2007 | Haemmerling et al. |
| 2007/0132560 A1 | 6/2007 | Nystrom et al. |
| 2007/0132573 A1 | 6/2007 | Quach et al. |
| 2007/0152424 A1 | 7/2007 | Deng et al. |
| 2007/0198190 A1 | 8/2007 | Bauer et al. |
| 2007/0216136 A1 | 9/2007 | Dietz |
| 2007/0260395 A1 | 11/2007 | Matsuoka et al. |
| 2007/0285808 A1 | 12/2007 | Beale |
| 2008/0027599 A1 | 1/2008 | Logan et al. |
| 2008/0027635 A1 | 1/2008 | Tengler et al. |
| 2008/0143593 A1 | 6/2008 | Graziano et al. |
| 2008/0147277 A1 | 6/2008 | Lu et al. |
| 2008/0148374 A1 | 6/2008 | Spaur et al. |
| 2008/0177443 A1 | 7/2008 | Lee et al. |
| 2008/0180526 A1 | 7/2008 | Trevino |
| 2008/0186384 A1 | 8/2008 | Ishii et al. |
| 2008/0231701 A1 | 9/2008 | Greenwood et al. |
| 2008/0231707 A1 | 9/2008 | Fontana |
| 2008/0312792 A1 | 12/2008 | Dechamp |
| 2008/0313050 A1 | 12/2008 | Basir |
| 2009/0005932 A1* | 1/2009 | Lee ....................... B60D 1/30 701/41 |
| 2009/0045924 A1 | 2/2009 | Roberts, Sr. et al. |
| 2009/0063053 A1 | 3/2009 | Basson et al. |
| 2009/0075624 A1 | 3/2009 | Cox et al. |
| 2009/0079828 A1 | 3/2009 | Lee et al. |
| 2009/0082935 A1 | 3/2009 | Leschuk et al. |
| 2009/0085775 A1 | 4/2009 | Otsuka et al. |
| 2009/0093928 A1 | 4/2009 | Getman et al. |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0153663 A1 | 6/2009 | Ramos |
| 2009/0198425 A1 | 8/2009 | Englert |
| 2009/0219147 A1 | 9/2009 | Bradley et al. |
| 2009/0228182 A1 | 9/2009 | Waldbauer et al. |
| 2009/0231441 A1 | 9/2009 | Walker et al. |
| 2009/0248346 A1 | 10/2009 | Fennel et al. |
| 2009/0253466 A1 | 10/2009 | Saito et al. |
| 2009/0271078 A1 | 10/2009 | Dickinson |
| 2009/0300701 A1 | 12/2009 | Karaoguz et al. |
| 2009/0306854 A1 | 12/2009 | Dechamp |
| 2009/0306861 A1 | 12/2009 | Schumann et al. |
| 2009/0318119 A1 | 12/2009 | Basir et al. |
| 2010/0060739 A1 | 3/2010 | Salazar |
| 2010/0063670 A1 | 3/2010 | Brzezinski et al. |
| 2010/0063702 A1 | 3/2010 | Sabelstrom et al. |
| 2010/0098853 A1 | 4/2010 | Hoffmann et al. |
| 2010/0114471 A1 | 5/2010 | Sugiyama et al. |
| 2010/0152989 A1 | 6/2010 | Smith et al. |
| 2010/0156667 A1 | 6/2010 | Bennie et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0174422 A1 | 7/2010 | Jacobsen et al. |
| 2010/0191421 A1 | 7/2010 | Nilsson |
| 2010/0194888 A1 | 8/2010 | McElroy et al. |
| 2010/0198491 A1 | 8/2010 | Mays |
| 2010/0222964 A1 | 9/2010 | Dechamp |
| 2010/0234071 A1 | 9/2010 | Shablay et al. |
| 2010/0305815 A1 | 12/2010 | Trueman et al. |
| 2010/0306309 A1 | 12/2010 | Santori et al. |
| 2010/0324770 A1 | 12/2010 | Ramsey et al. |
| 2010/0332049 A1 | 12/2010 | Sy et al. |
| 2011/0001825 A1 | 1/2011 | Hahn |
| 2011/0018231 A1 | 1/2011 | Gollenberg |
| 2011/0022282 A1 | 1/2011 | Wu et al. |
| 2011/0025482 A1 | 2/2011 | Algueera et al. |
| 2011/0050903 A1 | 3/2011 | Vorobiev |
| 2011/0063425 A1 | 3/2011 | Tieman |
| 2011/0087398 A1 | 4/2011 | Lu et al. |
| 2011/0088659 A1 | 4/2011 | Wang et al. |
| 2011/0102583 A1 | 5/2011 | Kinzalow |
| 2011/0110530 A1 | 5/2011 | Kimura |
| 2011/0112721 A1 | 5/2011 | Wang et al. |
| 2011/0112762 A1 | 5/2011 | Gruijters et al. |
| 2011/0125457 A1* | 5/2011 | Lee ....................... B60D 1/30 702/151 |
| 2011/0129093 A1 | 6/2011 | Karam et al. |
| 2011/0140872 A1 | 6/2011 | McClure |
| 2011/0149077 A1 | 6/2011 | Robert |
| 2011/0153198 A1 | 6/2011 | Kokkas et al. |
| 2011/0160956 A1 | 6/2011 | Chung et al. |
| 2011/0181457 A1 | 7/2011 | Basten |
| 2011/0185390 A1 | 7/2011 | Faenger et al. |
| 2011/0195659 A1 | 8/2011 | Boll et al. |
| 2011/0216199 A1* | 9/2011 | Trevino .................. B60D 1/36 348/148 |
| 2011/0257860 A1 | 10/2011 | Getman et al. |
| 2011/0281522 A1 | 11/2011 | Buda |
| 2011/0296037 A1 | 12/2011 | Westra et al. |

(56) References Cited

U.S. PATENT DOCUMENTS

| | | |
|---|---|---|
| 2012/0004805 A1 | 1/2012 | Gray et al. |
| 2012/0039537 A1 | 2/2012 | Keys |
| 2012/0041658 A1 | 2/2012 | Turner |
| 2012/0062743 A1 | 3/2012 | Lynam et al. |
| 2012/0062744 A1 | 3/2012 | Schofield et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0170286 A1 | 7/2012 | Bodem et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0212616 A1 | 8/2012 | Usami et al. |
| 2012/0221168 A1 | 8/2012 | Leng et al. |
| 2012/0224059 A1 | 9/2012 | Takamatsu |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0288156 A1 | 11/2012 | Kido |
| 2012/0290150 A1 | 11/2012 | Doughty et al. |
| 2012/0310594 A1 | 12/2012 | Watanabe |
| 2012/0314073 A1 | 12/2012 | Shimoda et al. |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038436 A1 | 2/2013 | Brey et al. |
| 2013/0041524 A1 | 2/2013 | Brey |
| 2013/0057397 A1 | 3/2013 | Cutler et al. |
| 2013/0076007 A1 | 3/2013 | Goode et al. |
| 2013/0082453 A1 | 4/2013 | Padula |
| 2013/0120161 A1 | 5/2013 | Wakabayashi et al. |
| 2013/0128047 A1 | 5/2013 | Lee |
| 2013/0141578 A1 | 6/2013 | Chundrlik, Jr. et al. |
| 2013/0148748 A1 | 6/2013 | Suda |
| 2013/0158803 A1 | 6/2013 | Headley |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0229524 A1 | 9/2013 | Vovkushevsky et al. |
| 2013/0250114 A1 | 9/2013 | Lu |
| 2013/0253814 A1 | 9/2013 | Wirthlin |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0074743 A1 | 3/2014 | Rademaker |
| 2014/0085472 A1 | 3/2014 | Lu et al. |
| 2014/0088797 A1 | 3/2014 | McClain et al. |
| 2014/0088882 A1 | 3/2014 | Ishimoto |
| 2014/0121883 A1 | 5/2014 | Shen et al. |
| 2014/0121930 A1 | 5/2014 | Allexi et al. |
| 2014/0125795 A1 | 5/2014 | Yerke |
| 2014/0156148 A1 | 6/2014 | Kikuchi |
| 2014/0160276 A1 | 6/2014 | Pliefke et al. |
| 2014/0168415 A1 | 6/2014 | Ihlenburg et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0200759 A1 | 7/2014 | Lu et al. |
| 2014/0210456 A1 | 7/2014 | Crossman |
| 2014/0218506 A1 | 8/2014 | Trombley |
| 2014/0218522 A1 | 8/2014 | Lavoie et al. |
| 2014/0222228 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267727 A1 | 9/2014 | Alaniz |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0307095 A1 | 10/2014 | Wierich |
| 2014/0309888 A1 | 10/2014 | Smit et al. |
| 2014/0324295 A1 | 10/2014 | Lavoie et al. |
| 2014/0343795 A1 | 11/2014 | Lavoie |
| 2014/0354811 A1 | 12/2014 | Weber |
| 2014/0358429 A1 | 12/2014 | Shutko et al. |
| 2014/0361955 A1 | 12/2014 | Goncalves |
| 2014/0379217 A1 | 12/2014 | Rupp et al. |
| 2015/0002669 A1 | 1/2015 | Reed et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0077557 A1 | 3/2015 | Han et al. |
| 2015/0094945 A1 | 4/2015 | Cheng et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0142211 A1 | 5/2015 | Shehata et al. |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0172582 A1 | 6/2015 | Kiyohara et al. |
| 2015/0179075 A1 | 6/2015 | Lee |
| 2015/0191200 A1 | 7/2015 | Tsubaki et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217692 A1 | 8/2015 | Yanagawa |
| 2015/0217693 A1 | 8/2015 | Pliefke et al. |
| 2015/0232031 A1 | 8/2015 | Kitaura et al. |
| 2015/0232092 A1 | 8/2015 | Fairgrieve et al. |
| 2015/0234386 A1 | 8/2015 | Zini et al. |
| 2015/0235484 A1 | 8/2015 | Kraeling et al. |
| 2015/0251602 A1 | 9/2015 | Baur et al. |
| 2015/0269444 A1 | 9/2015 | Lameyre et al. |
| 2015/0344028 A1 | 12/2015 | Gieseke et al. |
| 2015/0369613 A1 | 12/2015 | Stadler |
| 2016/0001705 A1 | 1/2016 | Greenwood et al. |
| 2016/0006922 A1 | 1/2016 | Boudreau et al. |
| 2016/0009288 A1 | 1/2016 | Yu |
| 2016/0023601 A1 | 1/2016 | Windeler |
| 2016/0023603 A1 | 1/2016 | Vico et al. |
| 2016/0039456 A1 | 2/2016 | Lavoie et al. |
| 2016/0052548 A1 | 2/2016 | Singh et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0207526 A1 | 7/2016 | Franz et al. |
| 2016/0229452 A1 | 8/2016 | Lavoie et al. |
| 2016/0280267 A1 | 9/2016 | Lavoie et al. |

(56) References Cited

U.S. PATENT DOCUMENTS

| | | |
|---|---|---|
| 2016/0304088 A1 | 10/2016 | Barth |
| 2016/0304122 A1 | 10/2016 | Herzog et al. |
| 2016/0320477 A1 | 11/2016 | Heimberger |

FOREIGN PATENT DOCUMENTS

| | | |
|---|---|---|
| CN | 201923085 U | 8/2011 |
| CN | 202541524 U | 11/2012 |
| CN | 10282686 B | 9/2013 |
| CN | 203292137 U | 11/2013 |
| DE | 2919831 A1 | 11/1980 |
| DE | 3625025 C1 | 10/1987 |
| DE | 3923676 A1 | 1/1991 |
| DE | 3931518 A1 | 4/1991 |
| DE | 9208595 U1 | 8/1992 |
| DE | 4224887 A1 | 9/1993 |
| DE | 19526702 A1 | 2/1997 |
| DE | 19702688 A1 | 7/1998 |
| DE | 19910153 A1 | 1/2001 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005045196 A1 | 9/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102005051804 B4 | 11/2007 |
| DE | 102006035021 B4 | 1/2008 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010004920 A1 | 7/2011 |
| DE | 102010006323 A1 | 8/2011 |
| DE | 102008004158 A4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0358973 A1 | 3/1990 |
| EP | 0239592 B1 | 3/1991 |
| EP | 0418653 A1 | 3/1991 |
| EP | 0433858 A2 | 6/1991 |
| EP | 0295396 B1 | 7/1992 |
| EP | 0841648 A2 | 5/1998 |
| EP | 0849144 A2 | 6/1998 |
| EP | 1038744 A1 | 9/2000 |
| EP | 1245445 A2 | 10/2002 |
| EP | 1253065 A2 | 10/2002 |
| EP | 1312492 A2 | 5/2003 |
| EP | 1361543 A2 | 11/2003 |
| EP | 1442931 A2 | 8/2004 |
| EP | 1529689 A1 | 5/2005 |
| EP | 1695888 A2 | 8/2006 |
| EP | 1593552 B1 | 3/2007 |
| EP | 1810913 A1 | 7/2007 |
| EP | 2168815 A1 | 3/2010 |
| EP | 2199188 A2 | 6/2010 |
| EP | 2388180 A2 | 11/2011 |
| EP | 2431225 A1 | 3/2012 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 1569073 B1 | 9/2014 |
| EP | 2803944 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2188012 A | 9/1987 |
| GB | 2265587 A | 10/1993 |
| GB | 2320326 A1 | 6/1998 |
| GB | 2342630 A | 4/2000 |
| GB | 2344481 A1 | 6/2000 |
| GB | 2356612 A | 5/2001 |
| GB | 2398048 A1 | 8/2004 |
| GB | 2398049 A | 8/2004 |
| GB | 2398050 A | 8/2004 |
| JP | 61006458 | 1/1986 |
| JP | 6159491 A | 3/1986 |
| JP | 63085568 | 6/1988 |
| JP | 01095980 A | 4/1989 |
| JP | 01095981 A | 4/1989 |
| JP | 0612597 A | 1/1994 |
| JP | 06028598 A | 4/1994 |
| JP | 08241499 A | 9/1996 |
| JP | 08289286 A | 11/1996 |
| JP | 09267762 A | 10/1997 |
| JP | 09328078 A | 12/1997 |
| JP | 10129461 A | 5/1998 |
| JP | 10001063 A | 6/1998 |
| JP | 11124051 A | 5/1999 |
| JP | 11157404 A | 6/1999 |
| JP | 11278319 A | 10/1999 |
| JP | 2000127851 A | 5/2000 |
| JP | 2000267181 A | 9/2000 |
| JP | 2001055099 A | 2/2001 |
| JP | 2001109999 A | 4/2001 |
| JP | 2001206211 A | 7/2001 |
| JP | 2002012172 A | 1/2002 |
| JP | 2002068032 A | 3/2002 |
| JP | 2002120775 A | 4/2002 |
| JP | 2012105158 A | 5/2002 |
| JP | 2002172988 A | 6/2002 |
| JP | 2002181518 A | 6/2002 |
| JP | 2003034261 A | 2/2003 |
| JP | 2003148938 A | 5/2003 |
| JP | 2003175852 A | 6/2003 |
| JP | 2004114879 A | 4/2004 |
| JP | 3716722 B2 | 11/2005 |
| JP | 2008027138 A | 2/2008 |
| JP | 2008123028 A | 5/2008 |
| JP | 2009171122 A | 7/2009 |
| JP | 2012162215 A | 8/2012 |
| JP | 2012166647 A | 9/2012 |
| JP | 2014002056 A | 1/2014 |
| JP | 2014034289 A | 2/2014 |
| KR | 1020060012710 A | 2/2006 |
| KR | 20060133750 A | 12/2006 |
| KR | 1020070034729 A | 3/2007 |
| KR | 20110114897 A | 10/2011 |
| KR | 2014015199 A | 9/2014 |
| TW | 200930010 A | 7/2009 |
| WO | 8503263 A1 | 8/1985 |
| WO | 9831146 A1 | 7/1998 |
| WO | 0044605 A1 | 8/2000 |
| WO | 0225291 A1 | 3/2002 |

(56) References Cited

FOREIGN PATENT DOCUMENTS

| | | | |
|---|---|---|---|
| WO | 2004007232 A1 | 1/2004 |
| WO | 2004088611 A1 | 10/2004 |
| WO | 2005116688 A2 | 12/2005 |
| WO | 2006042665 A1 | 4/2006 |
| WO | 2011117372 A1 | 9/2011 |
| WO | 2012059207 A1 | 5/2012 |
| WO | 2012103193 A1 | 8/2012 |
| WO | 2013048994 A1 | 4/2013 |
| WO | 2013070539 A1 | 5/2013 |
| WO | 2013081984 A1 | 6/2013 |
| WO | 2014006500 A2 | 1/2014 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |
| WO | 2015187467 A1 | 12/2015 |

OTHER PUBLICATIONS

Hodo et al, Effects of sensor placement and errors on path following control of a mobile robot-trailer system, Jul. 11-13, 2007.*
Caup et al, Video-based Trailer Detection and Articulation Estimation (Year: 2013).*
Great Britain Search Report for Appln. No. GB0400828.0, dated May 25, 2004, 3 pages.
Great Britain Search Report for Appln. No. GB0400831.4, dated May 24, 2004, 3 pages.
Great Britain Examination Report for Appln. No. GB0400828.0, dated Oct. 14, 2005, 2 pages.
Great Britain Search Report for Appln. No. GB0302835.4, dated Mar. 10, 2003, 3 pages.
Great Britain Search Report for Appln. No. GB0302837.0, dated Mar. 14, 2003, 3 pages.
Great Britain Search Report for Appln. No. GB0302841.2, dated Mar. 11, 2003, 2 pages.
Great Britain Search Report for Appln. No. GB0400825.6, dated May 25, 2004, 3 pages.
"Around View Monitor," Infinity, Autoblog.com by Damon Lavrinc, Nissan release, Tokyo, Oct. 12, 2007, 6 pages.
BMW X5 System, bmw.com, Oct. 16, 2007, 1 page.
2007 Audi A6 System, cnet.com, Editor's Review, Oct. 26, 2007, 5 pages.
Mercedes S550 System by Aaron Gold, About.com, 2007, 8 pages.
"Object Recognition and Segmentation in Videos by Connecting Heterogeneous Visual Features," by Gouet-Brunet, V.; Lameyre, B., Computer Vision and Image Understanding, Jul. 2008, 2 pages, vol. 111, Issue 1.
"Alpine Electronics Introduces Two New Driver Assist Solutions," Alpine Electronics of America, Inc. press release, Jan. 7, 2010, 2 pages, Torrance, California.
"An Adaptive Software and Systems Architecture for Drivers Assistance Systems based on Service Orientation," Wagner, M.; Zobel, D.; Meroth, A., International Journal of Machine Learning and Computing, Oct. 2011, pp. 359-366, vol. 1, No. 4, Germany.
"Rearview Parking Assist Systems," Donmar Sunroofs and Accessories, Brochure, Aug. 2013, 13 pages.
"Trailer Vision," Trailer Vision Ltd., Brochure, www.trailervision.co.uk, date unknown, 4 pages.
"Bluetooth-Based Wireless Connectivity in an Automotive Environment," Nusser, Rene, Pelz, Rodolfo Mann, VTC, 2000, pp. 1935-1942.
"A Hitchhiker's Guide to the Telematics Ecosystem," Whitfield, Kermit, Automotive Design and Production, Oct. 1, 2003, 3 pages.
"A Lightweight Remote Display Management Protocol for Mobile Devices," Narasimhan, N.; Janssen, C.; Pearce, M.; Song, Y., 2007, IEEE, pp. 711-715.
Microsoft, Navigation System, Sync Powered by Microsoft, Ford Motor Company, Jul. 2007, 164 pages.
Microsoft, Supplemental Guide, Sync Powered by Microsoft, Ford Motor Company, Nov. 2007, 86 pages.
"Top 10 Tech Cars: It's the Environment, Stupid," Voelcker, J., IEEE Spectrum, Apr. 2008, pp. 26-35.
Microsoft, Navigation System, Sync Powered by Microsoft, Ford Motor Company, Oct. 2008, 194 pages.
Microsoft, Supplemental Guide, Sync Powered by Microsoft, Ford Motor Company, Oct. 2008, 83 pages.
"Mapping Applications to the Cloud," Chantry, Darryl, Microsoft Corporation, Jan. 2009, 20 pages.
"A Voice-Activated Information Browser," Yarden et al., 2009, IEEE, pp. 1-5.
"Integration of Nomadic Devices with Automotive User Interfaces," Gil-Castineira et al., IEEE Transactions on Consumer Electronics, Feb. 2009, vol. 55, Issue 1, pp. 34-41.
Microsoft, Navigation System, Sync Powered by Microsoft, Ford Motor Company, Jul. 2009, 196 pages.
Microsoft, Supplemental Guide, Sync Powered by Microsoft, Ford Motor Company, Aug. 2009, 87 pages.
"Ford Unveils Open-Source Sync Developer Platform," Goodwin, Antuan, The Car Tech Blog, Oct. 29, 2009, 5 pages. Retrieved from http://reviews.cnet.com/8301-13746_7-10385619-48.html on Feb. 15, 2011.
"Full Circle: The Rose of Vehicle-Installed Telematics," Lamberti, Ralf, Telematics Munich, Nov. 10, 2009, 12 pages.
"Apple Files Patent Which Could Allow You to Control Your Computer Remotely Using iPhone," Dec. 18, 2009, 7 pages. Retrieved from www.iphonehacks.com on Jun. 22, 2010.
"Student Develop In-Car Cloud Computing Apps; Envision the Future of In-Car Connectivity," Newmark, Zack, May 4, 2010, 3 pages. Retrieved from www.worldcarfans.com on Jun. 18, 2010.
"Service Discovery Protocol (SDP)," Palo Wireless Bluetooth Resource Center, 7 pages. Retrieved from http://palowireless.com/infotooth/tutorial/sdp.asp on Aug. 3, 2010.
"Service and User Interface Transfer from Nomadic Devices to Car Infotainment Systems," Sonnenberg, Jan, Second International Conference on Automotive User Interfaces and Interactive Vehicular Applications (Automotive UI), Nov. 11-12, 2010, pp. 162-165.
"MobileSafer Makes It Easy to Keep Connected and Safe," ZoomSafer Inc., 2010, 5 pages. Retrieved from http://zoomsafer.com/products/mobilesafer on Dec. 28, 2010.
"PhonEnforcer FAQs," Turnoffthecellphone.com, 3 pages. Retrieved from http://turnoffthecellphone.com/faq.html on Dec. 28, 2010.
"How PhonEnforcerWorks," Turnoffthecellphone.com, 2 pages. Retrieved from http://turnoffthecellphone.com/howitworks.htm on Dec. 28, 2010.
European Search Report for Appln. No. EP11151623, Feb. 15, 2011, 7 pages.
"X Window System," Wikipedia, 19 pages. Retrieved from http://en.wikipedia.org/w/index.php?title=X_Window_System%oldid=639253038.
"Ford Super Duty: Truck Technology," www.media.ford.com, Sep. 2011, pp. 1-2.
"Ford Guide to Towing," Trailer Life magazine, 2012, pp. 1-38.
"Dodge Car: The Hot Compact Car," www.dart-mouth.com/engineering-development.html, pp. 1-6, date unknown.
"Adaptive Software and Systems Architecture for Driver Assistance Systems," Wagner et al., International Journal of Machine Learning and Computing, Oct. 2011, vol. 1, Nov. 4, pp. 359-365.
"Back Driving Assistant for Passenger Cars with Trailer," Lundquist et al., SAE International, ZF Lenksysteme GmbH, Schwaebisch Gmuend, Germany 2006, pp. 1-8.
"Understanding Tractor-Trailer Performance," Caterpillar, 2006, pp. 1-28.
"Trajectory Tracking Control of a Car-Trailer System," Divelbiss et al., IEEE, Control Systems Technology, Aug. 6, 2002, vol. 5, No. 3, ISSN: 1063-6536, pp. 269-278.
"Laser Scanner-Based Navigation for Commercial Vehicles," Stahn et al., IEEE, Intelligent Vehicles Symposium, Jun. 2007, pp. 969-974, print ISBN: 1931-0587.

(56) References Cited

OTHER PUBLICATIONS

"Neurointerfaces: Applications," Windrow et al., IEEE, Adaptive Systems for Signal Processing, Communications and control Symposium, Oct. 2000, pp. 441-444.
"Steering Assistance for Backing Up Articulated Vehicles," Zoebel et al., Systemics, Cybernetics and Informatics, Universitaet Koblenz-Landau, Germany, vol. 1, No. 5, pp. 101-016, date unknown.
"Development of Performance Specifications for Collision Avoidance Systems for Lane Change, Merging and Backing," Young et al., TRW Space and Electronics Group, Feb. 1995, pp. 1-31.
"09 F-150," Ford Motor Company, www.fordvehicles.com, pp. 1-30, date unknown.
"Heavy Vehicle Object Detection Systems," Michael Paine, Vehicle Design and Research Pty Limited for VicRoads, Jun. 2003, pp. 1-22.
"Hybrid Control of a Truck and Trailer Vehicle," Altafini et al., Springer-Verlag Berlin Heidelberg, HSCC 2002, LNCS 2289, 2002, pp. 21-34.
"2012 Edge—Trailer Towing Selector," Preliminary 2012 RV & Trailer Towing Guide Information, pp. 1-3.
"Meritor Wabco Reverse Detection Module for Trailers with 12-Volt Constant Power Systems," Technical Bulletin, TP-02172, revised Oct. 2014, pp. 1-8.
"USH0001469 Remotely Piloted Vehicle Control and Interface System," Simonoff, Adam, Aug. 1, 1995, pp. 1-7.
"Range Rover Evoque's Surround Camera System," Douglas Newcomb, Tech Feature Friday, Jun. 15, 2012, pp. 1-2.
"Electronic Trailer Steering, " VSE, Advanced Steering & Suspension Solutions, 2009, The Netherlands, pp. 1-28.
"WABCO Electronic Braking System—New Generation," Vehicle Control Systems—An American Standard Company, www.wabco-auto.com, 2004, pp. 1-8.
"Reverse-A-Matic-Wheel Direction sensor System Operation and Installation Manual," Wang, T., Dec. 15, 2005, pp. 1-9.
"Wireless-Enabled Microphone, Speaker and User Interface for a Vehicle," The IP.com, Aug. 26, 2004, pp. 1-5, IP.com Disclosure No. IPCOM000030782D.
"RFID Read/Write Module," Grand Idea Studio, 2013, pp. 1-3, http://www.grandideastudio.com/portfolio/rfid-read-write-module/.
"Adaptive Identification for Heavy-Truck Stability Control," Palkovics et al., Vehicle Systems Dynamics Supplement, vol. 25, No. Sup1, 1996, pp. 502-518.
"Convenience and Loadspace Features," Jaguar Land Rover Limited, 2012, pp. 1-15, www.landrover.com/us/en/lr/all-new-range-rover/explore/.
"Delphi Lane Departure Warning," Delphi Corporation, Troy, Michigan, pp. 1-2, date unknown.
"Shared Control Between Human and Machine: Using a Haptic Steering Wheel to Aid in Land Vehicle Guidance," Steele et al., University of Michigan, pp. 1-5, date unknown.
"Electric Power Steering," Toyota Hybrid System Diagnosis-Course 072, Section 7, pp. 1-10, date unknown.
"Telematics Past, Present, and Future," Automotive Service Association, www.asashop.org, May 2008, 20 pages.
"Fully Automatic Trailer Tow Hitch With LIN Bus," https://webista.bmw.com/webista/show? id=18605754998,lang=engb&print=1, pp. 1-5, date unknown.
"2012 Guide to Towing," Bunker, K., Trailer Life, 2012, pp. 1-42.
"iBall Wireless Trailer Hitch Camera," product Listing, Amazon, Nov. 2, 2010, pp. 1-5.
"Surround View System," ASL-Vision 360, 2010, 1 page.
"Control of a Car with a Trailer Using the Driver Assistance System:" Roh, J. et al., IEEE, International Conference on Robotics and Biomimetrics, Dec. 7-11, 2011, Phuket,Thailand, pp. 2890-2895.
"Development of Auto Alignment System Between Trailer and Freight Wagon Using Electronic Sensors for Intermodal Transportation," Yong Jin Lee et al., IEEE, 2010, pp. 1211-1215.
"Back-Up and Utility Light System" Back-Up Buddy Inc., Plainville, MA, pp. 1-2, date unknown.
"Implementation of Active Steering on a Multiple Trailer Long Combinatin Vehicle," A.M.C. Odhams et al., Cambridge University, Engineering Department, Cambridge, United Kingdom, pp. 1-3, date unknown.
"Robotic DGM Tow Vehicle Project Overview," Hodo et al., Auburn University, US Army Corp. of Engineers, pp. 1-9, date unknown.
"Driver Assistance System for Backward Maneuvers in Passive Multi-Trailer Vehicles," Morales et al., International Conference on Intelligent Robots and Systems (IROS), Oct. 7-12, 2012, pp. 4853-4858.
"The Vehicle Rear Lighting System for Safe Driving in Reverse," White Night Rear Lighting Systems, Cruiser Stainless Accessories, pp. 1-3, date unknown.
"Backing-Up Maneuvers of Autonomous Tractor-Trailer Vehicles Using the Qualitative Theory of Nonlinear Dynamical Systems" A. Gonzalez-Cantos, International Journal of Robotics Research, Jan. 2009, vol. 28, 1 page.
"Estimation of Articulation Angle for Tractor Semi-Trailer Based on State Observer," L. Chu et al., ACM Digital Library, ICMTMA 10 Proceedings of the 2010 International Conference on Measuring Technology and Automation, vol. 2, Mar. 2010, 1 page.
"An Investigation of ABS Strategies for Articulated Vehicles," F.W. Kienhofer et al., Cambridge University, Engineering Department, United Kingdom, date unknown, 13 pages.
"A Simple Tractor-Trailer Backing Control Law for Path Following," Zhe Leng et al., IEEE, Intelligent Robots and Systems (IROS) IEEE/RSj International Conference, Oct. 2010, 2 pages.
"Adaptive Generic Algorithm Observer and its Application to Trailer Truck Control System" H. Kinjo, IEEE, SICE-ICASE International Joint Conference, Oct. 2006, 2 pages.
"Design of a Stable Backing Up Fuzzy Control of Autonomous Articulated Vehicles for Factory Automation," A. Gonzalez-Cantos et al., Dept. of Systems Engineering and Automatic Control, University of Seville, Spain, 2001, 5 pages.
"A Feedback Control Scheme for Reversing a Truck and Trailer Vehicle," C. Altafini et al., IEEE, Robotics and Automation, Dec. 2001, vol. 17, No. 6, 2 pages.
"A New Approach in Intelligent Trailer Parking," A. Zare et al., IEEE, 2010 2nd International Mechanical and Electrical Technology (ICMET), Sep. 2010, 1 page.
"A Robust Stabilization Problem of Fuzzy Control Systems and its Application to Backing Up Control of a Truck-Trailer," K. Tanaka, IEEE Transactions on Fuzzy Systems, May 1994, vol. 2, No. 2, 1 page.
"Intelligent Parking Method for Truck in Presence of Fixed and Moving Obstacles and Trailer in Presence of Fixed Obstacles: Advanced Fuzzy Logic Technologies in Industrial Applications," M. Sharafi et al., IEEE, 2010 International Electronics and Information Engineering (ICEIE), Aug. 2010, vol. 2, 1 page.
"Effects of Sensor Placement and Errors on Path Following Control of a Mobile Robot-Trailer System" D. Hodo, IEEE, American Control Conference, Jul. 2007, 1 page.
"Intelligent Parking Method for Trailers in Presence of Fixed and Moving Obstacles," M. Sharafi, IEEE, 2010 3rd International Conference on Advanced Computer Theory and Engineering (ICACTE), Aug. 2010, vol. 6, 1 page.
"Steering and Independent Braking Control for Tractor-Semitrailer Vehicles in Automated Highway Systems," Chieh Chen et al., IEEE, Proceedings of the 34th IEEE Conference on Decision and Control, Dec. 1995, vol. 2, 1 page.
"An Input-Output Linearization Approach to the Control of an n-Body Articulated Vehicle," P. Bolzern et al., J. Dyn. Sys., Meas., Control, Sep. 2001, vol. 123, No. 3, 3 pages.
"Development of Configurations for Infrastructure-Friendly Five- and Six-Axle SemiTrailers," J.R. Billing et al., National Research Council of Canada and Ontario Ministry of Transportation, date unknown, 11 pages.
"Experiments in Autonomous Reversing of a Tractor-Trailer System," Cedric Pradalier et al., 6th International conference on Field and Service Robotics, inria-00195700, Version 1, Dec. 2007, 10 pages.

(56) References Cited

OTHER PUBLICATIONS

"Fuzzy Backing Control of Truck and Two Trailers," Andri Riid et al., Tallinn University of Technology, Tallinn, Estonia, date unknown, 6 pages.
"How to Avoid Jackknifing," J. McGrath, A Discovery Company, date unknown, 3 pages.
"Implementation of Active Rear Steering of a Tractor Semitrailer," B. Jujnovich et al., Cambridge University, Engineering Department, Cambridge, United Kingdom, date unknown, 10 pages.
"Feasibility Study for a Vehicle-Trailer Backing Up Control," Lee Yong H., Refdoc.fr, SAE Transactions, vol. 113, No. 6, 2004, 1 page.
"Active Steering of a Tractor-Semi-Trailer," A.M.C. Odhams et al., Proceedings of the Institution of Mechanical Engineers, Part D: Journal of Automobile Engineering, SAFE Journals, vol. 225, No. 7, Jul. 2011, 1 page.
"Automatic Brake Control for Trucks—What Good Is It?" G.S. Haviland, TRID, Society of Automotive Engineers, Sep. 1968, 1 page.
"UGV Trailer Position Estimation Using a Dynamic Base RTK System" W. Travis et al., American Institute of Aeronautics and Astronautics, Date unknown, 12 pages.
"VSE Electronic Trailer Steering," ETS for Trailers, version 2009, VSE Trailer Systems B.V., 2009, 28 pages.
"VBOX Yaw Rate Sensor with Integral Accelerometers," Racelogic, www.racelogic.co.uk, dtae unknown, 2 pages.
"Fuzzy Logic and Neural Network Control Systems for Backing up a Truck and a Trailer," P.D.C.R. Jayarathna et al., International Journal of Latest Trends of Computing, vol. 2, No. 3, Sep. 2011, 8 pages.
Institutionen for systemteknik Deartment of Electric Engineering, Olof Enqvist, Jan. 27, 2006, 57 pages.
Sh. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.
F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
Jung-Noon Hwang, Ronald C. Arkin, and Dong-Soo Kwon; "Mobile robots at your fingertip: Bezier curve on-line trajectory generation for supervisory control," IEEE/RSJ, International Conference on Intelligent Robots and Systems, Las Vegas, Nevada, Oct. 2003, 6 pages.
M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

* cited by examiner

VEHICLE TRAILER ANGLE DETECTION SYSTEM AND METHOD

CROSS-REFERENCE TO RELATED APPLICATIONS

This application is a continuation of U.S. patent application Ser. No. 14/854,285 filed Sep. 15, 2015, entitled VEHICLE TRAILER ANGLE DETECTION SYSTEM AND METHOD," now U.S. Pat. No. 9,566,911, which is a continuation of U.S. patent application Ser. No. 13/448,529, filed Apr. 17, 2012, entitled "VEHICLE MANEUVERING AIDS," now U.S. Pat. No. 9,156,496 which is a division of U.S. patent application Ser. No. 11/936,860 filed Nov. 8, 2007, entitled "VEHICLE MANEUVERING AIDS," which is now abandoned, which claims foreign priority benefits under 35 U.S.C. § 119(d)-(d) to UK 0705336.6, filed Mar. 21, 2007. The aforementioned related applications are hereby incorporated by reference.

FIELD OF THE INVENTION

The present invention generally relates to maneuvering aids for vehicles and particularly for vehicles which are towing a trailer, such as a caravan.

BACKGROUND OF THE INVENTION

It is known to equip vehicles with external video cameras for displaying to the driver an image of the surroundings in order to provide assistance with parking and reversing maneuvers. A track for a given steering angle can be superimposed on the displayed image including systems that display the view from a rearward-looking video camera onto a touch screen which is used to input a desired destination, such as a parking bay. Steering cues are also displayed on the screen for assisting the driver in the maneuvering operation.

SUMMARY OF THE INVENTION

A first feature provides a method for determining hitch angle in a vertical or horizontal plane between a vehicle and a trailer attached to the vehicle by means of a tow hitch. The method includes the steps of tracking a marker associated with the trailer across a field of view of a rearward-looking video camera and converting a lateral displacement of the marker in the field of view to an angular displacement.

A second feature provides a means for predicting a path of a trailer and displaying the predicted path to the driver of a vehicle to which the trailer is attached. The path being displayed as an overlay on a view from a vehicle-mounted video camera. One method of predicting the trailer path includes the steps of determining a hitch angle, θt, between the vehicle and trailer, determining a hitch length, H, between an axle of the trailer and a point of attachment of the trailer to the vehicle, calculating a turning radius R where R=H/θt, where the trailer is predicted to follow the circumference of a circle of radius R. A view from a video camera mounted on the rear of the vehicle or on a door mirror is utilized.

A third feature tracks obstacles close to the path of a vehicle using multiple vehicle-mounted video cameras with pan and zoom capability. One method of tracking these obstacles includes the steps of detecting the proximity of an obstacle using a vehicle-mounted proximity sensor, panning a vehicle-mounted video camera towards the location of the obstacle, and displaying a video camera view of the obstacle to a driver of the vehicle.

A fourth feature reliably informs the vehicle and driver when a trailer is hitched to the vehicle. This is so that systems concerned with dynamic stability control or active suspension, e.g. can be set to the correct operating conditions. Systems that only monitor the trailer's electrical connection cannot distinguish between a trailer and light bars. A rearward-looking camera may be used to detect the presence of a trailer. One method of detecting the trailer includes the steps of comparing an image from a rearward-looking, vehicle mounted video camera with stored data representing a trailer.

A fifth feature provides a method for assisting in hitching a trailer to a vehicle. One method of assisting includes the steps of displaying a view from a rearward-looking, vehicle-mounted video camera on a screen visible to the driver, identifying a tow hitch in the displayed view, zooming the camera view to display a close-up of the vehicle's tow ball and the trailer's tow hitch and adjusting the camera's zoom facility as the vehicle and trailer move relative to one another to maintain a displayed view of the tow ball and hitch.

A sixth feature includes using one or more vehicle-mounted cameras configured to detect strobed light, such as that emitted by emergency vehicles. A warning message can then be generated for display to the driver of the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
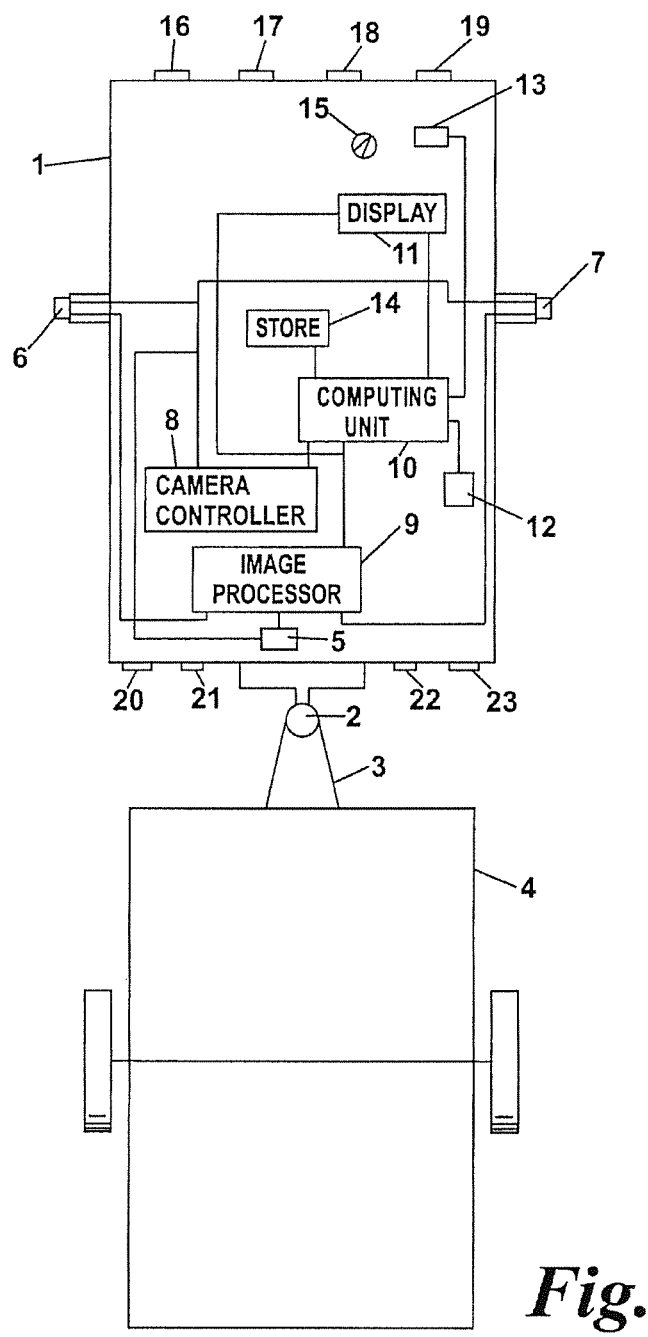
FIG. 1 is a schematic view of a trailer and vehicle, the latter incorporating apparatus for effecting methods of assisting maneuvers of the trailer-vehicle combination.

In FIG. 1 a vehicle 1 is provided with a tow ball 2 to which the hitch 3 of a trailer 4 is attached.

The vehicle 1 is fitted with three video cameras. A first video camera 5 is mounted on the rear of the vehicle 1 and looks rearwards towards the trailer 4. This rearward-looking camera has a zoom facility. Two door mirror mounted video cameras 6, 7 are also provided. These door mirror mounted cameras 6, 7 may be panned so that they look forwards, rearwards and to a side of the vehicle 1. All three cameras 5, 6, 7 are controlled by a camera controller 8 and the outputs from each camera are fed to an image processor 9.

Outputs of the image processor 9 are fed to a computing unit 10 and display screen 11 and the camera controller 8. The computing unit 10 generates signals for controlling the camera controller 8 and display screen 11 which is visible to the driver of the vehicle 1. The computing unit 10 receives signals from a speed sensor 12, a steering angle sensor 13 and a vehicle and trailer parameter store 14. A mode selector switch 15 has an output which is connected to the image processor 9.

Ultrasonic parking distance sensors 16-23 are provided on the front and the rear of the vehicle. Their outputs are connected to the camera controller 8. Four sensors are fitted at each end of the vehicle in order to give good coverage and resolution.

Operation of a first embodiment, comprising a method of measuring the hitch angle (in a horizontal plane between the vehicle 1 and the trailer 4) will now be described with reference to FIGS. 1 and 2. The method utilizes a tracking marker such as a mark or sticker attached to the trailer or a vertical edge of the trailer which is visible to the rearward-looking video camera 5. The image processor 9 locates this marker within the camera's field of view and feeds this information to the computing unit 10 which calculates the hitch angle.

Figure 2:
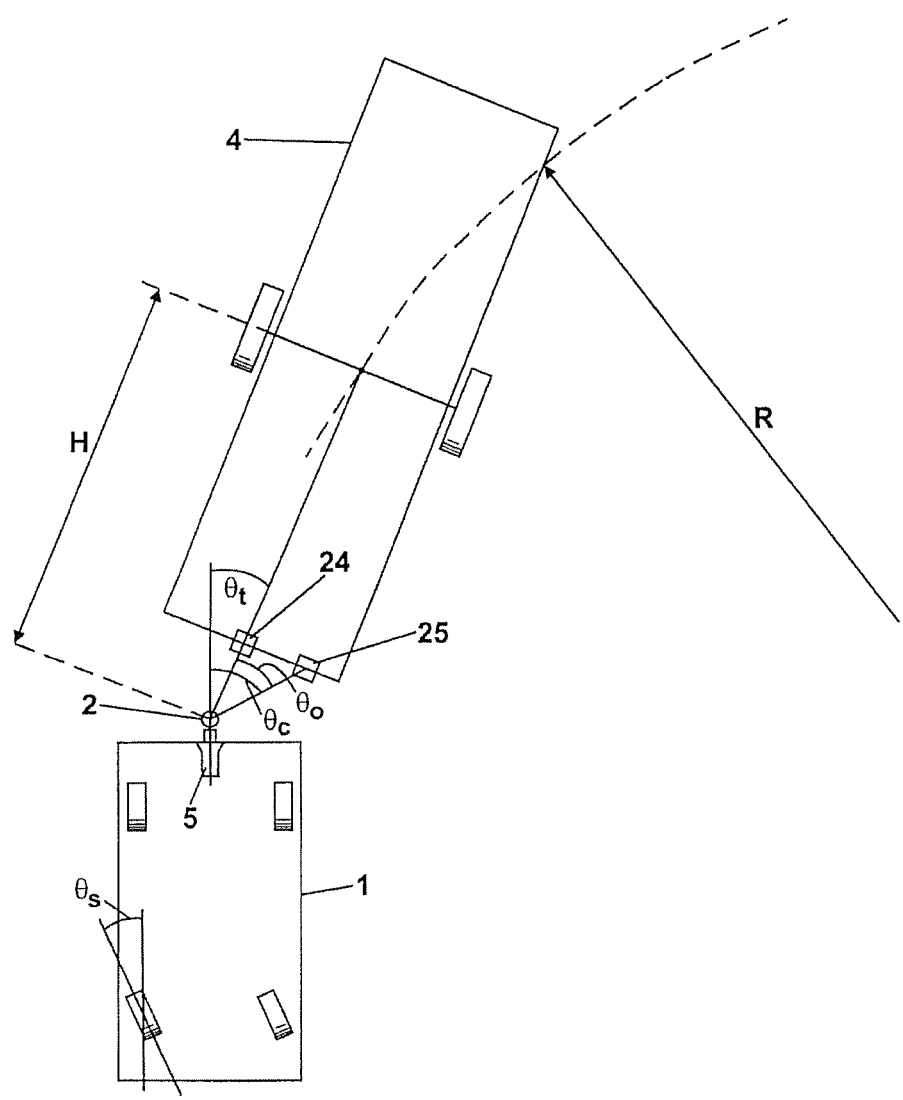
FIGS. 2 and 3 are plan views of the vehicle-trailer combination of FIG. 1 showing certain geometrical parameters of the combination.

In a first example, a high visibility marker 24 is placed on the center-line of the trailer 4 (see FIG. 2). From knowledge of the trailer and vehicle geometric parameters e.g. tow hitch length (held in the store 14) and the position of the marker within the camera's 5 field of view, the computing unit 10 can calculate the hitch angle $\theta t$.

Placement of the marker on the trailer's center-line may not always be possible or convenient. So in a second example, a marker 25 is placed offset from the center-line by an offset angle $\theta o$. Then, the hitch angle=$\theta c - \theta o$ where $\theta c$ is the target angle which is calculated in the computing unit 10.

The offset angle $\theta o$ is derived by the computing unit 10, in a learning phase, by noting the value of $\theta c$ when the vehicle is traveling in a straight line, i.e. when the steering angle sensor 13 outputs a value of zero for steering angle $\theta s$. So, when this condition is fulfilled, $\theta o = \theta c$, so the offset angle is now known.

Extending the principle of the above second example, the image processor 9 can pick out its own marker on the trailer 4. This could be a caravan window or an edge of the trailer, for example. The feature selected can be highlighted on the display screen 11 so that the driver can confirm that it is actually rigidly connected to the trailer. The computing unit 10 is then adapted to compare the movement of this target with steering movements and check for any anomalies.

As a refinement to the hitch angle calculation, some averaging of the measurements is carried out, particularly in the learning phase. This helps to cancel out the errors due to flexing of the trailer structure.

The learning phase can be eliminated on trailer re-use. The computing unit 10 can store the learned geometry of the trailer so that it can be recalled. Alternatively, the learning phase can be run continually as a check on the stored values with updating as required. This continual check is useful in any case as a compensation for drift due to other variables.

By comparing the measured hitch angle $\theta t$ with a reference value held in the store 14 for a given trailer length, the computing unit 10 can detect the onset of jack-knifing while reversing. When this occurs, the computing unit 10 generates a warning signal to the driver. This warning can be audible or a visual signal on the display screen 11.

In addition to measuring hitch angle, the invention provides a method for measuring the pitch angle (i.e. in a vertical plane), between the vehicle 1 and trailer 4. Pitch angle is usually zero or close to zero but can deviate from zero when traveling on uneven ground or reversing down a slipway, for example. The same principles apply, with the image processor 9 selecting a mark or horizontal edge of the trailer. By comparing the pitch angle determined by the computing unit 10 with a reference value, the unit 10 can detect imminent grounding of the hitch 3 and signal a warning to the driver.

A second embodiment of the invention provides a method of predicting a trailer reversing path and displaying it to the driver by means of an overlay on the display.

Say, for example, the driver needs to reverse the vehicle and trailer combination into a parking bay.

Knowing the hitch angle $\theta t$, (either from the method of the first embodiment described above or from some other method or sensor output), and the hitch length H (the distance between the trailer's axle and tow hitch, see FIG. 3) the computing unit 10 computes a trailer path.

Figure 3:
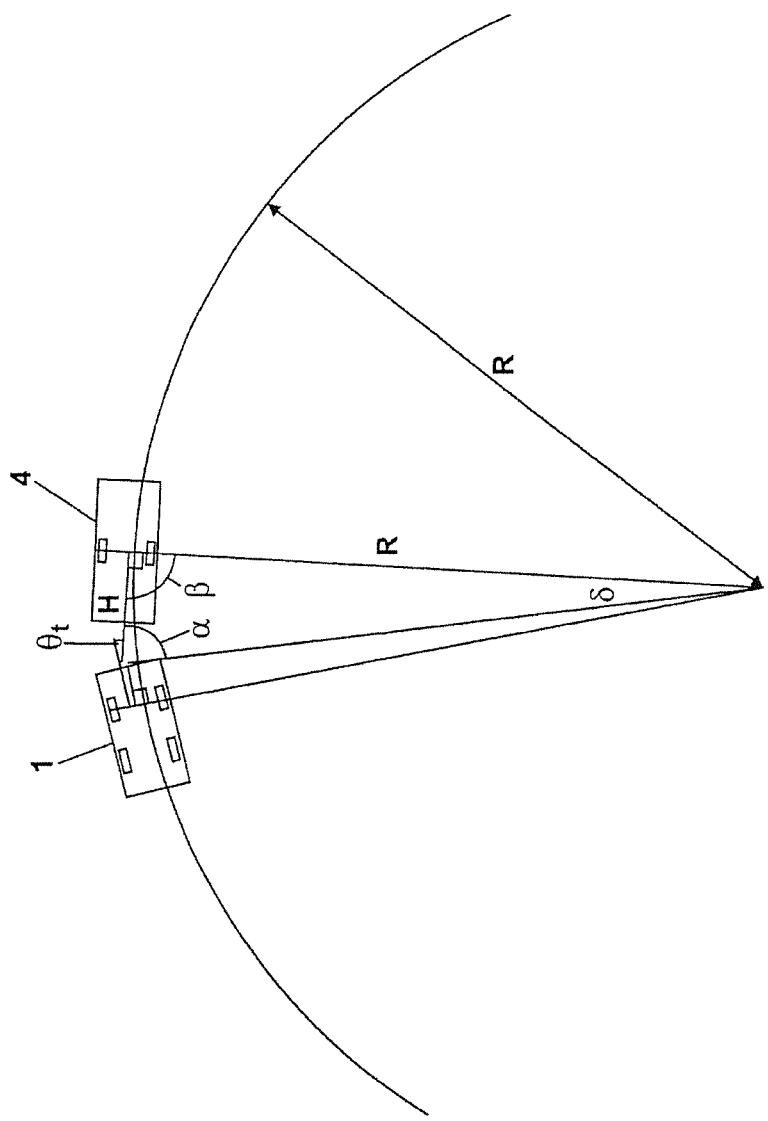

The path of the trailer 4 can be described by a turning radius R. In practice R and $\theta t$ vary during the maneuver but for small steering angle movements can be assumed to be constant. With reference to FIG. 3, it can be seen that the hitch angle $\theta t$, hitch length H and turning radius R are associated approximately by equation:

$$\alpha + \beta + \delta = \pi$$

Substituting $\beta = \pi/2$ and $\alpha = \pi/2 - \theta t$ gives $\theta t = \delta$ $\tan \delta = H/R = \delta = \theta t$ for small $\theta t$ So $R = H/\theta t$ ($\theta t$ in radians)           Equation (1)

The hitch length H may be manually entered into the store 14 for the particular trailer 4 or it may be calculated in the computing unit 10 while the driver performs the following maneuver.

The vehicle-trailer combination is driven in a circular path and R is derived from the steering angle, $\theta s$, and the dimensions of the vehicle. The value of $\theta t$ is derived from the camera 5 view. These values are then inserted into equation (1) to give a value for H.

In an alternative learning process for hitch length, H, while the vehicle-trailer combination is being driven, the value of $\theta t$ calculated from equation (1) using a calculated value for R (from steering angle and vehicle dimensions) and an estimate for H is compared with the measured value of $\theta t$. The value of H is varied in subsequent calculations until the best match is achieved with the measured value for $\theta t$. This value of H is then stored.

The path of the reversing trailer 4 computed by the computing unit 10 is displayed on the display screen 11 as an overlay on top of the view from one of the cameras 5, 6, 7. The path is computed by building up incremental changes as a function of $\theta t$ and R. The projected path is continuously updated as the steering angle $\theta s$ and consequently the hitch angle $\theta t$ vary.

The path can be overlaid on the rear camera's view, but will only be useful to the driver if the rear corners of the trailer are also displayed, e.g. for a low trailer. For a large trailer, e.g. a caravan, this is not so useful. In this latter case, the projected path is overlaid on to a view from one of the door mirror mounted cameras 6, 7, specifically, the camera which can see the trailer 4 at that particular moment in the maneuver. A correction has to be applied, however, if the trailer path is calculated with respect to the rear camera view.

Any misalignment in either camera will introduce errors in the information presented to the driver. This is remedied by electronically adjusting the view from the camera by aligning the image (or at least, the pixel data) with known hard points on the vehicle. For example, the mirror camera is looking rearwards but is misaligned laterally. The image processor 9 re-aligns the image to correct the alignment. Taken to the extreme, this will allow the arrangement to be used with the mirror folded in.

This embodiment can be extended to show the path of the trailer wheels while traveling in a forwards direction so that "kerbing" of the inside trailer wheels can be avoided on sharp bends. Conveniently, the trailer's path can be overlaid on the view from a forward-looking, door mirror mounted camera.

The learning process can be eliminated on trailer re-use. The store 14 can store the learned geometry of the trailer so that it can be recalled. Reversing assistance is then available straight away. The learning process is then run continually as a check on the stored values with updating as required. This continual check is useful in any case as a compensation for drift due to other variables.

The overlay tracks showing the projected path of the trailer can, conveniently have their starting point at the trailer's wheels. If the pitch angle of the tow hitch changes markedly then the guide lines comprising the overlay can appear to be in mid air rather than on the ground. If the pitch angle is known, then the computing unit 10 can effect a correction to the guide lines.

Operation of a third embodiment of the invention, which facilitates the tracking of obstacles, will now be described.

In this example, the door mirror mounted cameras 6, 7 are triggered by one or more of the parking distance sensors 16-19 when the vehicle comes within close range of an object. On the display screen 11, the driver will be presented with a view of the obstacle and a part of the exterior of the vehicle closest to it.

In an off-road or other tight maneuvering situation, the driver may want to continue to observe the object while driving past it. For example, while driving past a boulder, the driver will want to ensure that the boulder is not contacted by the side of the vehicle.

Clearly it is possible for the driver to manually control the camera to adjust its aim while driving past the object. However, this requires intervention by the driver and may distract him/her from other driving tasks.

This embodiment makes use of the ability of the cameras 6, 7 to pan and zoom electronically.

By virtue of the parking distance sensors 16-23 the location of an object relative to the vehicle 1 is known. This information is fed to the camera controller 8 so that the most appropriately located camera can be panned and zoomed in towards the position of the detected obstacle.

As a further refinement, the computing unit 10 is also provided with the location of the object relative to the vehicle along with steering angle (from the sensor 13) and speed (from the speed sensor 12).

As the vehicle moves onwards, the relative position of the object can be calculated from the wheel speeds combined with the steering angle or from individual wheel speeds. Hence an approximate real time location can be calculated and the camera panned to follow the object without driver intervention, with the computing unit 10 providing a control signal for the camera controller 8.

There may be instances where the ground is slippery causing individual wheels to slip or the vehicle to slide. In such cases, speed measurements and/or steering measurements will be in error. To overcome this problem, the image processor 9 is adapted to analyze the image and match the object in the field of view between consecutive frames. This will allow ground velocity errors to be detected and corrected. For example, if the vehicle is sliding sideways towards the object, the camera can be made to pan towards the vehicle.

As a further enhancement to this second embodiment, the same recognition algorithm is employed in the image processor to enable the cameras 6, 7 to follow a moving object, following initial detection by the parking distance sensors 16-23.

For example, a child or animal which has been detected is shown as an image on the display screen 11 by the relevant camera. The image processor 9 then tracks the child's (or animal's) position through consecutive frames and the camera controller 8 adjusts pan and zoom controls to keep the moving object in the field of view.

The video cameras 5, 6, 7 may have an enhanced infra-red capability so that they are particularly sensitive in locating hot objects such as people and animals. Such "hot-spots" can be identified by the image processor 9 and highlighted on the display screen 11.

In an alternative arrangement, the zooming and panning operations are performed by the computing unit 10 instead of by the cameras 6, 7.

Operation of a fourth embodiment, which enables detection of a trailer, will now be described.

The rearward facing camera 5 detects the presence of the trailer 4 and sends its image to the computing unit 10 via the image processor 9. By comparing the received image with parameters stored in the store 14, the computing unit can determine the type of trailer, e.g. caravan, low loader etc. The size and shape of the trailer can thus give an indication of its weight and aerodynamic drag. This information can be used by vehicle systems such as stability control systems.

Once the vehicle-trailer combination is on the move, the trailer type can further be confirmed by monitoring the dynamic behavior of the combination using on-board sensors (not shown).

Operation of a fifth embodiment will now be described. This embodiment provides a means for assisting in attaching the trailer 4 to the vehicle 1.

Using the camera system shown, it is possible to simplify the trailer hitching process in that both the trailer and the tow hitch can be seen in a camera image by the driver. This allows hitching of a trailer without the need for external guidance.

However, the image must necessarily be wide to allow the trailer to be approached but then the image of the tow ball and hitch are small and difficult to resolve. Also, the driver's judgment is still required to steer the vehicle appropriately based on the image.

This embodiment provides a solution to both these problems. The rear camera image is processed in the image processor 9.

Firstly, the driver selects a "hitch mode" using the mode selector switch 15. In response, the image processor 9 selects the rear camera view to display on the screen 11 and searches for an object with the triangular shape and size characteristics of a typical A-frame tow hitch. When detected, the image is zoomed in to contain the vehicle tow ball 2 and the tow hitch 3. This can be done electronically by the computing unit 10 or by activating a zoom facility on the camera 5 via the camera controller 7.

There may be an optional "confirm" function for the driver to confirm that the identified object is the trailer or to adjust the location for unusually shaped hitches.

As the vehicle approaches (or moves away from) the trailer, the zoom setting is adjusted to maintain the view of both the hitch and tow ball. Consequently, when the tow ball 2 is close to the hitch 3, the driver will be given the optimum view to allow accurate alignment.

In an alternative mode of operation, the image processor 9 is continuously monitoring the rear camera's output and the driver does not need to use the mode selector switch. On detection of the hitch 3, the image processor 9 presents the rear camera view to the display 11.

Optionally, and as an additional safety feature, if the parking distance sensors 16-23 detect an object in the path of the vehicle and close enough to risk a collision but outside the zoomed image, the image is zoomed out to show the object.

In a further mode of operation of this fourth embodiment, the computing unit 10 generates an overlay image on the display screen 11 which is the projected trajectory of the tow ball 2. This is calculated from the vehicle's steering angle (provided by the steering angle sensor 13) and from vehicle geometry parameters held in the store 14. (This projected trajectory can assist in initially finding the hitch by panning the camera to look along the trajectory).

The trajectory is overlaid as a guide line on the zoomed image. In this way, the driver can adjust the steering angle to cause the trajectory and hitch to coincide. Reversing the vehicle will then place the hitch over the tow ball.

In some vehicles, it may not be possible to locate a camera on the body of the vehicle such that it has the view of the tow ball. For example, the tow ball may be obscured by the bumper. In this case, a "virtual tow ball" is applied to the image, i.e. a dot vertically above the actual location of the tow ball, to allow alignment and ranging of the hitching operation. The exact placement of the dot can be determined with reference to other fixed points in the image, e.g. the periphery of the vehicle as well as a predetermined absolute position. This allows for tolerance in the installation of the camera.

As the computing unit 10 knows the location of the tow ball 2 and the hitch 3 and also knows the current steering angle, it is possible to display to the driver instructions to steer left or right to optimize the alignment.

This could be integrated with other vehicle control mechanisms (not shown) such that the guidance information is applied automatically via the power steering system to steer the vehicle to align the tow hitch. The brake and throttle could be controlled automatically as well.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for determining a hitch angle of a trailer attached to a vehicle, comprising:
    a camera operable to capture images rearward of the vehicle;
    an image processor processing the captured images and locating a position of a marker on the trailer; and
    a computer determining the hitch angle between the vehicle and the trailer based on the position of the located marker.

2. The system of claim 1, wherein the camera is located on the vehicle.

3. The system of claim 1, wherein the marker comprises at least one of a mark, a sticker attached to the trailer and an edge of the trailer.

4. The system of claim 1 further comprising a display for displaying a trailer view visible to a driver of the vehicle.

5. The system of claim 1, further comprising a steering angle sensor for sensing a vehicle steering angle, wherein the computer further calculates a predicted path of a trailer from the hitch angle and the vehicle steering angle.

6. The system of claim 1 further comprising the step of displaying the marker on a display for a driver confirmation that the selected marker is rigidly connected to the trailer.

7. The system of claim 1, wherein the computer compares the hitch angle to a stored value and, if the hitch angle is within a predetermined range of the stored value, wherein the trailer is likely to jack-knife, generating a warning signal to the driver indicative of an imminent jack-knife event.

8. A method of determining a hitch angle of a trailer towed by a vehicle, comprising:
    obtaining an image of a trailer towed by the vehicle with a camera;
    tracking a position of a marker associated with the trailer in the image with an image processor; and
    determining with a computer the hitch angle between the vehicle and trailer based on the position of the marker.

9. The method of claim 8, wherein the camera is located on the vehicle.

10. The method of claim 8 further comprising the steps of:
    measuring a steering angle of the vehicle; and
    calculating with the computing unit a predicted path of the trailer from the hitch angle and steering angle.

11. The method of claim 10 further comprising the step of displaying the predicted trailer path on a display as an overlay track on the image.

12. The method of claim 8, wherein the marker comprises at least one of a mark, a sticker attached to the trailer and an edge of the trailer.

13. The method of claim 8 further comprising the step of displaying a trailer view visible to a driver of the vehicle.

14. The method of claim 8 further comprising the step of displaying the marker on a display for a driver confirmation that the selected marker is rigidly connected to the trailer.

15. The method of claim 8 further comprising the steps of comparing the hitch angle to a stored value and, if the hitch angle is within a predetermined range of the stored value, wherein the trailer is likely to jack-knife, generating a warning signal to the driver indicative of an imminent jack-knife event.

16. A method of predicting a path of a trailer attached to a vehicle, comprising:
    measuring a vehicle steering angle;
    obtaining an image of the trailer with a video camera;
    tracking a position of a marker associated with the trailer in the image using an image processor;

determining a hitch angle between the vehicle and trailer based on the position of the marker using a computer; and calculating a predicted path of the trailer from the hitch angle and vehicle steering angle using the computer.

17. The method of claim 16, wherein the camera is located on the vehicle.

18. The method of claim 16 further comprising the step of displaying the predicted trailer path on a display.

19. The method of claim 18 further comprising the step of displaying the predicted trailer path on a display as an overlay track on the image.

20. The method of claim 16, wherein the marker comprises at least one of a mark, a sticker attached to the trailer and an edge of the trailer.

* * * * *